United States Patent
Le Flem

(10) Patent No.: US 8,097,070 B2
(45) Date of Patent: Jan. 17, 2012

(54) AIR CLEANERS FOR ELECTRICAL MACHINES

(75) Inventor: Graham Le Flem, Warwickshire (GB)

(73) Assignee: Converteam Technology Ltd., Warwickshire (GB)

( * ) Notice: Subject to any disclaimer, the term of this patent is extended or adjusted under 35 U.S.C. 154(b) by 66 days.

(21) Appl. No.: 12/596,687

(22) PCT Filed: Apr. 21, 2008

(86) PCT No.: PCT/GB2008/001395
§ 371 (c)(1),
(2), (4) Date: Mar. 24, 2010

(87) PCT Pub. No.: WO2008/129286
PCT Pub. Date: Oct. 30, 2008

(65) Prior Publication Data
US 2010/0186592 A1     Jul. 29, 2010

(30) Foreign Application Priority Data
Apr. 21, 2007  (GB) ................................. 0707729.0

(51) Int. Cl.
*B01D 45/12* (2006.01)

(52) U.S. Cl. ................. 95/270; 55/400; 55/405; 55/406; 55/408; 55/409; 55/461; 55/448; 55/418

(58) Field of Classification Search .................. 55/400, 55/405–406, 408–409, 461, 448, 418; 95/270; 454/251
See application file for complete search history.

(56) References Cited

U.S. PATENT DOCUMENTS

| | | | |
|---|---|---|---|
| 1,963,398 A | 6/1934 | Blair | |
| 2,460,752 A * | 2/1949 | Jacobsen | 310/57 |
| 4,119,873 A * | 10/1978 | Sakurai | 310/56 |
| 4,348,604 A * | 9/1982 | Thode | 310/62 |
| 6,627,166 B1 * | 9/2003 | Simon | 423/210 |
| 2003/0233932 A1 * | 12/2003 | Ekeroth | 95/12 |
| 2003/0233939 A1 * | 12/2003 | Szepessy et al. | 95/270 |

FOREIGN PATENT DOCUMENTS

| | | |
|---|---|---|
| JP | 63-287373 A | 11/1988 |
| JP | 2006-005990 A | 1/2006 |
| SU | 584 875 A1 | 12/1977 |

* cited by examiner

*Primary Examiner* — Jason M Greene
*Assistant Examiner* — Dung H Bui
(74) *Attorney, Agent, or Firm* — Eckert Seamans Cherin & Mellott, LLC; David C. Jenkins, Esquire

(57) ABSTRACT

A forced air open-ventilation systems for cooling electrical machines is provided. The forced air open-ventilation system includes an air cleaner having an air chamber with a first end, where air is drawn in from the surroundings, and a second end, opposite the first end, where air is drawn out of the air chamber, via a first outlet. A rotating means is contained within the air chamber and may be driven to rotate about an axis that extends between the first end and the second end of the chamber. The rotating means applies a centrifugal force to any airborne particles entering the air chamber and throws them radially outwards from the central axis. These particles are then drawn out of the air chamber, via at least one second outlet formed adjacent to a radially outer edge of the rotating means, by a high-velocity outlet stream of the open-ventilation system.

18 Claims, 2 Drawing Sheets

AIR CLEANERS FOR ELECTRICAL MACHINES

CROSS REFERENCE TO RELATED APPLICATION

This application is a U.S. National Stage of PCT/GB2008/001395 which claims priority to GB Patent Application No. 0707729.0 filed Apr. 21, 2007.

TECHNICAL FIELD

The present invention relates to air-cooled electrical machines. In particular the invention provides an improved air cleaner apparatus for open-ventilated electrical machines.

BACKGROUND ART

All electrical machines generate heat during their operation. This heat is detrimental to the operation as overheating decreases the operational efficiency of a machine and may even cause damage. In extreme cases, overheating of an electrical machine can cause complete failure. It is therefore necessary that all electric machines are cooled. At the simplest level, small low-power electrical motors may be cooled sufficiently through thermal contact with their surrounding environment. However, most electrical machines require a much greater degree of cooling and therefore incorporate a suitable cooling system. There are many different cooling systems that are currently in use. For example, machines may be cooled by a closed circuit carrying a liquid coolant to a heat exchanger or by direct gas cooling. The specific cooling system that is incorporated with any electrical machine will depend on the size, power and construction of the machine, among other factors.

Cooling systems inevitably add to the size, weight and cost of the electrical machine. Cooling can be a particular problem for electrical machines that are required to be particularly small, light and low cost, for example wind turbine generators. In such machines it is preferable to minimize the size and weight of the cooling system. Therefore it is often preferable that the cooling systems of such machines utilise the surrounding air to cool the machine. This is because such systems are not required to contain and circulate large quantities of heavy liquid coolant, which can add significantly to the weight and size of the cooling system. It is even more preferable that surrounding air is used to directly cool such machines without the use of bulky and heavy heat exchangers. Direct cooling of electrical machines by the surrounding air is often known as open-ventilation.

Open-ventilation is a very efficient cooling method for electrical machines since there is no intermediate heat exchange system which would otherwise reduce the available temperature rise for the machine. However, open-ventilation systems are not commonly used without some form of protection because the surrounding air used to cool open-ventilated electrical machines often carries dirt dust, moisture; salt and other impurities. If the surrounding air does contain substantial quantities of airborne particles then significant damage can be caused to the exposed parts of the machine during passage of that air through the open-ventilation system. The damage is caused by the particles colliding with the exposed parts of the machine. This problem is compounded by the fact that, in order to increase the degree of cooling provided by open-ventilation systems, it is preferable that the cooling air is forced by mechanical means to pass through the electrical machine at a relatively high-velocity and/or pressure. This can make the damage caused by particles colliding with exposed parts of the machine much worse. As a result, it is usually necessary that open-ventilation systems incorporate a means of removing at least some of the particles from the air that enters the electrical machine.

Currently, in order to prevent particles from entering open-ventilated high-power electrical machines, they are usually contained within box-type enclosures. These enclosures allow open-ventilation of the electrical machine via blow-through inlet and outlet chambers. The most common are National Electrical Manufacturers Association (NEMA) II-type enclosures. In these enclosures the incoming air is channeled in ducting through at least three 90° changes of direction and into a low velocity air chamber before entering the machine. This has the result of separating out a proportion of the airborne particles present in the incoming air before the air enters the electrical machine itself.

Although box-type enclosures do remove a proportion of the particles from the incoming air, they have been found not to be effective enough for many situations. For example, machines with NEMA II-type enclosures have particularly suffered in desert situations, where the surrounding air may contain particularly high quantities of solid particles, especially sand. Furthermore, mechanically increasing the velocity of the air passing through a box-type enclosure reduces its efficiency in removing particles from the air. Box-type enclosures also have a problem with the build up of particulate matter which has been removed from the air passing through the enclosure. This is because, as the enclosures clean the air in a passive manner, relying on changes of direction and a low velocity air chamber and have no active way of ejecting the particles back into the surrounding air, a relatively large proportion of the particles that are removed from the air simply build up within the enclosure. Over time this leads to a decrease in the efficiency of operation of any enclosure. It also means periodic cleaning of box-type enclosures in order to remove particle build-up is necessary.

Filters are also commonly used to clean incoming air in open-ventilated machines. Filters are used either in isolation, as the sole method of cleaning the air, or integrated with other air-cleaning devices. For example, filters are commonly incorporated in the box-type enclosures discussed above. Typically, filters are comprised of simple mesh screens that are located in positions such that all the air entering the open-ventilation system must pass through at least one filter. Large particles present in the incoming air cannot pass through the filter or filters and are thereby prevented from passing throughout the electrical machine.

Some electrical machines have more than one set of filters. Specifically, some machines may have open-ventilation systems formed such that the incoming air first passes through a relatively coarse filter designed to remove larger particles and then through a progression of finer filters, each designed to remove smaller particles than the immediately preceding filter.

Upon initial use, filters are reasonably effective at removing large particles from air entering an open-ventilation system. However, their effectiveness deteriorates with time, especially if they are not regularly maintained. The rate of deterioration can be particularly hard to predict as it depends upon external factors, including the quantity and nature of any particles present in the incoming air. Furthermore, some filters such as box-type enclosures, only passively remove particles from the incoming air. That is, a relatively large proportion of particles removed from the incoming air by the filters simply accumulate within the open-ventilation system. It is also very difficult to use filters to remove extremely small particles from incoming air, particularly if a high air velocity and/or pressure is utilised within an open-ventilation system.

Due to the disadvantages described above, neither box-type enclosures nor filters, or even a combination of the two, provides a reliable method of removing airborne particles in environments where the surrounding air has high particle content or where the air passes through an open-ventilation system at high-velocity and/or pressure. There is therefore a need for an improved air cleaner apparatus for removing particles from incoming air in open-ventilated electrical machines. Such an apparatus is required to be small and light-weight, and preferably low in cost. It is preferable that any such apparatus is capable of being incorporated with current conventional enclosures and open-ventilation systems. It is also preferable that the apparatus is capable of use with high-velocity and/or high pressure open-ventilation systems and in environments where the air may contain large amounts of particles. It is also desirable that such an apparatus actively removes the particles from the open-ventilation system in order to prevent the build up of such particles within the system.

As a result of this need, it has previously been proposed to use centrifugal force, as applied by a fan or other such rotating means, to remove solid or liquid particles from air entering an open-ventilation system. One example of such an apparatus is disclosed in JP 56125950. In this apparatus air is allowed to enter an open-ventilation system from the surrounding environment, the solid particles present in the air are removed and the air is then channeled into an electric machine. Specifically, air is allowed to enter the open-ventilation system via an inlet formed in the centre part of the front side of a filter frame. The incoming air then enters a conical passage where it is subjected to a rotary force. Solid particles present in the incoming air are thrown radially outwards into a dust collecting chamber surrounding the conical passage. The cleaned air then passes through a filter and into the electric machine. In this manner, the open-ventilation system of JP 561 25950 provides active cleaning of incoming air. However, this system does not expel the particles that are removed from the incoming air. Instead those particles are collected within a dust collecting chamber. Therefore periodic emptying of the dust collection chamber is necessary.

An electric machine incorporating a similar open-ventilation system is disclosed in GB 1106589. In this system cooling air is drawn into a chamber that is formed at one end of the casing of the electric machine. The air entering the chamber is immediately rotated by a fan that is mounted on the drive shaft of the electric machine and that also acts to draw the surrounding air into the open-ventilation system. Solid particles present in the incoming air are thrown to the radially outer edge of the chamber as a result of the centrifugal force applied by the fan. These particles then enter an outlet air stream rather than passing through the machine. The outlet air stream is formed only at the radially outer edge of the chamber. Therefore, the majority of the incoming air is allowed to enter and circulate around the machine. In this manner the electrical machine of GB 1106589 provides active cleaning of incoming air. This machine also expels solid particles cleaned from the incoming air completely out of the machine. This means that the expelled particles cannot build up within the machine and decrease the efficiency of its operation or cause it damage.

The open-ventilation system of GB 1106589 has a number of problems. First, because the fan that is providing the centrifugal force to the incoming air also acts to draw the air into the machine the two processes are inseparable. This means it is not possible to independently regulate the centrifugal force applied to the incoming air and the volume of air that is drawn into the machine, as may be desired. Furthermore, although the particles that are removed from the incoming air are generally thrown towards an outlet air stream, there is little or no active force which draws those particles into the outlet air stream, other than the centrifugal force from the drive-shaft fan. As a result, it is likely that a relatively high proportion of the solid particles entering the open-ventilation system of GB 1106589 will not be removed from the system and will be circulated around the electric machine.

Due to the problems discussed above, open-ventilation systems that utilise centrifugal force to remove solid particles from incoming air have not been employed for use on electrical machines on a commercial scale. This is despite the concept being known for many years. For example, the basic concept was disclosed as long ago as 1964 in GB 977042.

SUMMARY OF INVENTION

The present invention provides an air cleaner for a forced air open-ventilation system of an electrical machine, the open-ventilation system having a high-velocity outlet stream, the air cleaner comprising an air chamber that may optionally include a first end and a second end, opposite the first. The air chamber has at least one inlet (typically located at the first end) through which air can be drawn in from the surroundings by the open-ventilation system, at least one first outlet (typically located at the second end) through which air can be drawn out of the air chamber by the open-ventilation system, rotating means contained within the air chamber and drivable to rotate about an axis, and wherein the air chamber further comprises at least one second outlet through which air can be drawn out of the air chamber by the high-velocity outlet stream of the open-ventilation system.

The air cleaner of the present invention operates in the following manner. Air containing particulate matter to be removed (e.g. solid or liquid particles) is allowed to enter the open-ventilation system of the electrical machine from the surrounding environment. This air then enters the air chamber of the air cleaner at its first end via the at least one inlet. The air in the air chamber, and particles suspended in the air, may then be rotated by the rotating means such that they are subject to a centrifugal force that acts to throw the air radially outwardly and towards the at least one second outlet of the air cleaner. The centrifugal force provided by the rotating means acts to separate out any particles present in the air via a process of sedimentation. In other words, particles that enter the air chamber through the at least one inlet will be thrown radially outwardly by the rotating means such that the air within the air chamber that is at or near the axis of the rotating means will be substantially particle-free, whilst air that is at or near the radially outer edge of the rotating means will contain a relatively high density of particles.

The forced air open-ventilation system acts to draw the air out of the air chamber via the at least one first outlet and the at least one second outlet. The effect of the forced passage of air through the open-ventilation system draws air directly out of the at least one first outlet at the second end of the air chamber, through the open-ventilation system before ejecting it from the open-ventilation system via the high-velocity outlet stream. Furthermore, the effect of the high-velocity outlet stream passing the at least one second outlet of the air chamber causes the air within the air chamber adjacent to the at least one second outlet to be drawn out of the chamber and join the outlet stream, where it is ejected from the open-ventilation system without first passing through the open-ventilation system.

Importantly, as the at least one second outlet of the air chamber is preferably formed adjacent to the radially outer edge of the rotating means, any particles that enter the air chamber will be thrown towards the at least second outlet by the centrifugal action of the rotating means. Therefore, those particles will be drawn out of the air chamber and into the high-velocity outlet stream via the at least one second outlet and they will not pass through the open-ventilation system. As a result, air that is drawn out of the air chamber via the at least one first outlet and that passes through the open-ventilation system will contain much lower quantities of particles than the air that enters the first end of the air chamber from the surrounding environment. In this manner, the present invention minimises the amount of damage that may be caused to an electrical machine by the passage of particles through its open-ventilation system.

A particular advantage of the air cleaner of the present invention is that the particles that are removed are not retained in the open-ventilation system but are actively ejected from the cooling system via the at least one second outlet and the high-velocity outlet stream. The 'Bernoulli effect' helps to expel particles from the air chamber and thereby minimises clogging of the air cleaner. As a result, there will be negligible build up of particles within either the air cleaner or the open-ventilation system. This is in contrast to box-type enclosures which, when used alone, commonly suffer from the accumulation of solid particles.

Preferably, the air chamber of the present invention is substantially cylindrical such that the axis of rotation of the rotating means is coaxial with an axis of the chamber and a cylindrical wall of the air chamber is formed adjacent to the radially outer edge of the air chamber. It is also preferable that the first and second ends of the air chamber are formed adjacent to the axial ends of the rotating means. That is, it is preferable that the air chamber is formed closely around the rotating means. However, the first and second ends of the air chamber need not be enclosed. Substantially the whole of the first or second end of the air chamber may form the at least one first inlet or the at least one first outlet to the air chamber respectively. Forming the air chamber closely around the rotating means is preferable as it minimises the weight and volume of the chamber, which is an important consideration in many applications.

It is preferable that the at least one inlet to the air chamber is formed such that air enters the first end of the chamber at or near the radially outer edge of the rotating means. This ensures that the air is rotated sufficiently by the rotating means and thereby experiences a substantial centrifugal force. This is preferred as if the incoming air enters the air chamber at the radially outer edge of the rotating means it cannot simply pass through the air chamber along the axis of the rotating means without being subject to a significant rotational force.

It may also be preferable that there is a single conical first inlet to the air chamber. For example, the first inlet may be formed such that the incoming air is drawn into a conical inlet via a circular opening formed at an outer or upstream end of the inlet, then be channeled along a conical passage formed within the conical inlet and enter the air chamber through an annular opening formed at a downstream end of the inlet and the first end of the air chamber adjacent to the radially outer edge of the rotating means. If the first inlet is conical, it is preferable that it is rotationally symmetric and coaxial with the rotating means.

It is generally preferable that the at least one first outlet to the air chamber is formed at or near the axis of the rotating means. This is preferable as it helps ensure that any particles introduced into the air chamber and are thrown to the radially outer edge of the air chamber are not drawn out of the chamber via the at least one first outlet and thereby pass through the open-ventilation system. For example, there may be a single first outlet to the air chamber that is substantially circular, formed at the second end of the air chamber and is coaxial with, and has a smaller radius than, the rotating means.

It is generally preferable that the or each at least one second outlet of the air chamber will be formed such that it has a first or upstream end that is formed in the wall of the air chamber adjacent to the radially outer edge of the rotating means and a second, or downstream end that is formed adjacent to the high-velocity outlet stream. Thereby the effect of the outlet stream passing adjacent to the second end of the or each at least one second outlet will create a pressure differential across the length of each second outlet. That is, when the open-ventilation system is operating the pressure at the downstream end of each second outlet will be lower than the pressure at the upstream end of each outlet aided by the 'Bernoulli effect'. Thus air will be drawn out of the air chamber, via each second outlet, and into the high-velocity outlet stream. As would be appreciated by a person skilled in the art, the magnitude of this effect can be increased by effecting a reduction in the pressure of the high-velocity outlet stream as it passes each second outlet. This could be achieved by, for example, forming the passage through which the outlet stream travels such that it reduces in cross-section immediately before it passes each second outlet.

It is anticipated that it will be generally preferable that the or each at least one second outlet is formed at the lower side of the air chamber. In this manner any particles that are precipitated out of the air by the rotating means or simply by loss of kinetic energy will fall to the bottom of the air chamber where they will pass through the at least one second outlet and are ejected from the open-ventilation system by the high-velocity outlet stream.

It may also be preferable that the hot air leaving the open-ventilation system is used to warm the air chamber of the air cleaner. This may prevent moisture contained in the air entering the air chamber from condensing within the air chamber, mixing with any dust or other soluble particles in the air chamber and thereby clogging the air cleaner.

Despite the above, it is to be appreciated that the design of any air cleaner according to the present invention should be created according to its specific intended use. Design factors that may be varied include the number of first inlets and first and second outlets along with their size, shape and positioning. The size and nature of the rotating means may also be varied. The preferred design for any air cleaner according to the present invention will maximise the clean air leaving through the at least one first outlet whilst simultaneously minimising the leakage of dirty air through that outlet or outlets. Any design according to the present invention may be evaluated and adapted using computer analysis tools, as would be understood by a person skilled in the art.

The air cleaner of the present invention may be formed in an open-ventilation system either such that the surrounding air enters the at least one first inlet of the air cleaner directly or such that it first passes through a preliminary portion of the open-ventilation system. However, it is generally preferable that the length of any preliminary portion of the open-ventilation system is minimised. This is because the air that passes through such a preliminary portion will not yet have been cleaned by the air cleaner and therefore may contain a large quantity of particles. These particles could cause significant damage to any such portion of the open-ventilation system. This is particularly important if a machine is operating in an environment where forced air open-ventilation would not normally be used due to the high particle content of the surrounding air but is made possible by the inclusion of an air cleaner according to the present invention, for example a desert location.

Air forcing means within open-ventilation systems are particularly susceptible to damage caused by collision with particles carried by the air passing through such systems. It is therefore preferable that if the air cleaner of the present invention is incorporated in a forced air open-ventilation system, the air forcing means is located at, or near, the high-velocity outlet stream but before the at least one second outlet of the air chamber. Locating the air forcing means in this manner is preferable as the air cleaner acts to remove particles from the air passing through the open-ventilation system from the at least one first outlet to the air chamber and diverts the removed particles to the high-velocity outlet stream via the at least one second outlet of the air chamber. Therefore, there will be negligible, or at least greatly reduced, quantities of particles passing through such open-ventilation systems between these two points and it is preferable to locate the air forcing means therein.

It is preferable that the present invention is incorporated, in an open-ventilation system having an air forcing means that is a large diameter, high pressure fan.

Furthermore, in order to protect either the air forcing means or the electrical machine being cooled by the open-ventilation system from damage, it may be generally preferred to provide further protecting means within the open-ventilation system. For example, filters may be included in the open-ventilation system and these may act as a back-up protection to collect any smaller particles not collected by the air cleaner. Such protecting means would be positioned within the open-ventilation system to ensure that particles are removed from the air passing through the system before the air passes through and cools the associated electrical machine.

In order to further protect against damage caused by particles passing through an open-ventilation system containing an air cleaner according to the present invention it may be preferable that the internal components of the associated electrical machine are protected. For example, the windings of the machine may be enclosed and the other internal components may be given a weatherproof protective treatment.

When operating the rotating means of the present invention is driven to rotate. This may be achieved by a number of different methods. If the electrical machine being cooled by the open-ventilation system is a rotating electrical machine, the rotating means of the air cleaner may be formed directly on the shaft of the rotating machine, such that is driven by the rotation of the electrical machine. This construction ensures that the rotating means is rotated, and therefore the air cleaner is functioning, at all times when the associated rotating electric machine is operating. Furthermore, this construction may minimise the weight of the air cleaner as a separate drive mechanism for the rotating means is not required. However, in some situations this construction may not be preferred as the speed of rotation of the rotating means will necessarily be the same as the speed of rotation of the electrical machine. It is not possible to independently regulate the centrifugal force applied to incoming air by the rotating means in open-ventilation systems formed in this manner.

Alternatively, air cleaners according to the present invention may be constructed such that the rotating means is indirectly driven by the rotation of shaft of the associated electrical machine. For example, it may be driven by a drive mechanism that is powered by the rotation of the shaft of the electrical machine but that enables the rotating means to rotate at a different speed from the shaft. Such a drive mechanism might be such that the rotating means always operates at a fixed ratio of the rotational speed of the shaft of the electrical machine. As a further alternative, the drive mechanism might enable the rotational speed of the rotating means to be controlled substantially independently from the rotational speed of the shaft, for example through the use of a gearing mechanism.

Alternatively, air-cleaners according to the present invention may be constructed such that the rotating means is driven by a driving means that is substantially separate from the associated electrical machine. For example, the rotation of the rotating means may be driven and controlled by a separate independent motor.

It is preferable that the rotating means of an air cleaner according to the present invention is driven such that its rotational speed may be controlled independently from the operation of the associated electrical machine. This is because it may be desirable to vary the degree to which the air entering the open-ventilation system is cleaned without altering the speed of operation of the electric machine. For example, it may be preferable that the rotating means is rotated at a higher speed when there is a larger quantity of incoming air and/or the incoming air has a relatively high particle content and that the rotating means is only rotated at low speeds, or possibly not rotated at all, when the incoming air is has a low or negligible particle content.

If the rotating means is controlled independently from the electric machine the operation of the rotating means may be controlled by a feed-back system. The characteristics of the air entering the cooling system, such as the speed and particle content of the air, may be determined by sensing means, for example one or more sensors. The sensing means would control the rotating means to operate at a speed suitable for the air conditions via feed-back to control unit. Sensors may be positioned in the air surrounding the open-ventilation system or within the air cleaner or open-ventilation system. They may directly measure the characteristics of the air entering the system or may determine them indirectly, for example from the characteristics of the air leaving the system, or the power output of the electrical machine itself.

Similarly, as will be appreciated by a person skilled in the art, the air forcing means of an air cleaner according to the present invention may also be driven directly or indirectly by the associated electrical machine or may be driven independently from that machine.

Preferably, the rotating means of the air cleaner and the air forcing means of the associated open-ventilation system may be controlled independently. The speed of rotation of the rotating means is generally proportional to the degree of cleaning provided to air entering the open-ventilation system. The air forcing means controls the rate of passage of air through the open-ventilation system and therefore the degree of cooling provided by the open-ventilation system. As a result, it is often beneficial to control the two independently of each other. For example, in relatively clean environments when the associated electrical machine is operating at or near its maximum rate it may be necessary to circulate air through the open-ventilation system at a high rate in order to provide a satisfactory degree of cooling but it may not be necessary to operate the air cleaner due to the clean surrounding environment. Conversely, in environments where the surrounding air contains high quantities of particles, it may be necessary to operate the air cleaner even when only a relatively low degree of cooling is required from the open-ventilation system.

However, it is to be understood that, whilst it is preferable that the rotating means of the air cleaner and the air forcing means of the open-ventilation system are controlled separately, satisfactory open-ventilation systems containing air cleaners according to the present invention may also be constructed such that the control of the rotating means and the air forcing means are intimately related. For example, satisfactory open-ventilation systems containing air cleaners according to the present invention having both the rotating means of the air cleaner and the air forcing means of the open-ventilation system mounted on the shaft of an associated rotating electrical machine may be constructed.

The present invention may be formed as an independent component that can be affixed to and removed from a separate forced air open-ventilation system. Alternatively, the present invention may be formed as an integral part of a forced air open-ventilation system.

The present invention is particularly suitable for incorporation in open-ventilation systems that are used to cool wind turbine generators The operation of the present invention can be simply mathematically modelled. Very approximately, when a particle enters the first end of the air chamber via the first inlet it will be travelling parallel to the axis of the rotating means. In order for that particle to be expelled through the at least one second outlet of the air chamber and not pass straight through the chamber it must be deflected radially outwards by the rotating means. That is, the centrifugal force exerted on the particle by the rotating means must deflect the particle radially outwards from the central axis and out through the at least one second outlet. However, air velocity pressure acting radially inwards within the air chamber, will directly oppose the centrifugal force. Therefore, if a particle is to be removed from the air cleaner via the at least one second outlet the centrifugal force from the rotating means must exceed the aerodynamic radial inward force.

The centrifugal force (in Newtons) acting upon a particle can be approximated as:

$$F_1 = M\omega^2 R$$

where M=the mass of the particle (kg);
R=the distance of the particle from the central axis of the rotating means (m); and
$\omega$=rate of rotation of the rotating means (rad/sec).

The velocity pressure of a fluid (in Pa) can be approximated to be:

$$P = 0.5\rho v^2$$

where $\rho$=density of fluid (kg/m$^3$); and
v=radial velocity of fluid (m/sec).

Therefore the particle will experience an inward force (in Newtons) due to the velocity pressure of:

$$F_2 = PA$$

where A=the aerodynamic surface area of the particle (m$^2$).

Typically, an exemplary air cooled rotating machine may operate at 1500 rpm, have a power rating of 5 MW and an efficiency of 97.8%. If this machine is air cooled a temperature rise in the air passing through the machine of 45 K would be considered acceptable and, therefore the machine would require a cooling air flow rate of approximately 2.4 m$^3$/sec. Such a machine may use an air cleaner according to the present invention with a 1 m diameter air chamber containing a rotating means of substantially the same diameter.

If a particle enters the air cleaner of the above machine at the radially outer edge of the air chamber it will experience a centrifugal force of:

$$F_1 = \left(\frac{2\pi 1500}{60}\right)^2 0.5M = 12300M$$

A spherical particle within the air chamber will have a mass of:

$$M = \frac{4\pi}{3}r^3\rho_0$$

where r=the radius of the particle in metres; and
$\rho_0$=the density of the particle (kg/m$^3$).
Therefore:

$$F_1 = 12300\frac{4\pi}{3}r^3\rho_0$$
$$F_1 = 51700r^3\rho_0$$

The mean radial velocity of the air in the air chamber is dependent upon the air flow rate through the air chamber and the air entry area of the at least one first outlet. Specifically, the mean radial velocity can be approximate to be:

$$v = \frac{f}{a}$$

where f=the mean flow rate of air through the air chamber (m$^3$/sec); and
a=the mean air entry area of the at least one first outlet (m$^2$).

Preferably, the air entry area of the at least one first outlet will be maximised in order to produce a radially inward air velocity within the air chamber. For example, in the above machine with an air chamber radius of 1 m the air entry area of the at least one first outlet may be 0.8 m$^2$ (i.e. a=0.8). The density of air is very approximately 1.2 kg/m$^3$, therefore within the air cleaner of the above machine:

$$F_2 = \frac{1}{2}1.2\left(\frac{2.4}{0.8}\right)^2 A = (5.4)A$$

If a particle is spherical its aerodynamic area is equal to:

$$A = \pi r^2$$

and:

$$F_2 = 5.4(\pi r^2) = 17.0 r^2$$

A particle will be deflected radially outwards by the rotating means if:

$$F_1 > F_2$$

$$51700 r^3 \rho_0 > 17.0 r^2$$

$$r\rho_0 > 3.3 \times 10^4$$

Thus, whether a particle entering the air chamber is deflected by the rotating means is dependent upon its size and density. Using the calculations above it can be shown that a particle of sand (density 2500 kg/m$^3$) passing through this specific air cleaner would have to be less than 0.26 μm in diameter not to be deflected by the rotating means. Similarly a water particle (density 1000 kg/m$^3$) would have to be smaller than 0.66 μm in diameter not to be deflected by the rotating means.

However, it is to be understood that the calculation given above is highly simplified and based upon a large number of assumptions. A person skilled in the art will appreciate that a detailed computational fluid dynamic study is required to optimise the design of any air cleaner according to the present invention.

DRAWINGS

Figure 1:
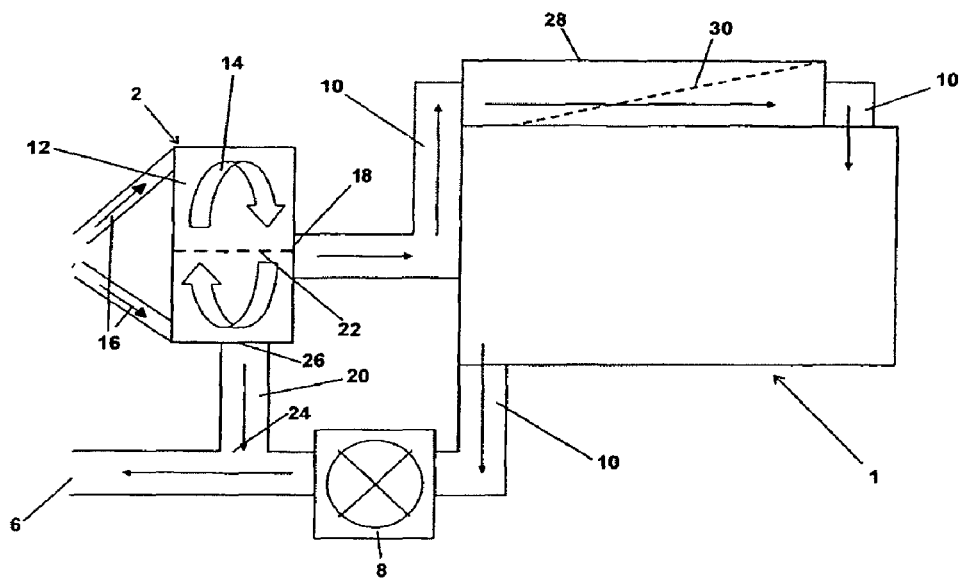
FIG. 1 is a schematic cross-section of a forced air open-ventilation system that includes an air cleaner according to the present invention and is integrally formed about an electrical machine.

The operation of an air cleaner 2 according to the present invention may be understood with reference to FIG. 1. The open-ventilation system of which the air cleaner 2 forms a part is a one-way system. That is, air enters the system from the surrounding environment via a conical inlet 16, passes through the system and exits via a single outlet 6. The air is forced through the open-ventilation system by a large-diameter high-pressure fan 8 that is located near the outlet 6 and is channeled through the system in ducting 10. The direction of passage of the air through the open-ventilation system is indicated in FIG. 1 by arrows.

The air cleaner 2 is substantially comprised of a cylindrical air chamber 12 that contains an air rotating means 14. The air chamber 12 has a conical inlet 16, a first outlet 18 and a second outlet 20. The rotating means 14 is driven to rotate about a central axis 22. A downstream end of the inlet 16 is situated at a first end of the air chamber, the first outlet 18 is situated at a second end of the chamber and the central axis extends between the first and second ends of the chamber and is substantially coaxial with the inlet 16 and the first outlet 18. The second outlet 20 is formed in a wall of the chamber 22 between the first inlet 16 and the first outlet 18, radially outwards from the central axis 22 and adjacent to the radially outer edge of the rotating means 14. The first outlet 18 leads, via a section of ducting 10 to a filter enclosure 28 that is formed on an upper side of an electrical machine 1. The second outlet 20 leads to a portion of the open-ventilation system that is located after the fan 8 but before the outlet 6.

When the open-ventilation system is operating, the fan 8 acts to draw surrounding air into the system through the conical inlet 16 and it is thereby channeled into the air chamber 12. As the inlet 16 is conical, air enters the air chamber 12 at or near the radially outer edge of the rotating means 14 and the air chamber.

During operation of the open-ventilation system the rotating means 14 of the air cleaner 2 is driven to rotate. The rotation of the rotating means 14 results in a centrifugal force being applied to air entering the air chamber 12. In particular, this applies a centrifugal force to any solid or liquid particles or other impurity particles present in the air that is channeled into the air chamber 12 and acts to throw those particles radially outwardly from the central axis 22 of the rotating means 14. In this manner it is ensured that particles entering the air chamber 12 remain near the radially outer edge of the air chamber, adjacent to the second outlet 20 and away from the first outlet 18.

Air is drawn out of the air chamber 12 by the action of the fan 8 through both the first outlet 18 and the second outlet 20. The action of the fan 8 directly draws air out of the chamber 12 through the first outlet 18. Due to the location of the first outlet 18 at or near the central axis 22 of the rotating means 14, air that is drawn out of the air chamber 12 through that outlet will be substantially particle free. In this manner the air that passes through the electrical machine 1 will be significantly cleaner than the air that enters the open-ventilation system from the surroundings.

Air drawn out of the first outlet 18 is channeled through the open-ventilation system by the ducting 10. After the cleaned air has been drawn out of the air chamber 12 through the first outlet 18 it is channeled through ducting 10 to a filter enclosure 28 formed on the upper side of the electrical machine 1. The filter enclosure 28 contains a large filter 30 that removes from the air any particles that have not been removed by the air cleaner 2. Furthermore, the filter 30 may act as a back-up to protect the electrical machine 1 should the air cleaner 2 fail. The filter 30 is positioned at an acute angle to the direction of flow of the air in order to maximise its effective surface area. The filter enclosure 28 is externally accessible so that the filter 30 can be easily monitored and replaced if necessary. Monitoring the particle build up on and around the filter 30 may give an indication as to the function of the air cleaner 2. For example, if a large quantity of particles are being filtered out of the air the air cleaner 2 may not be functioning adequately.

After passing through the filter enclosure 28 the air is channeled through the electrical machine 1 where it acts to cool the machine in a conventional manner, as would be understood by a person skilled in the art. As a further back-up against failure of the cleaner 2 the windings of the electrical machine 1 are sealed and the other internal components of the machine are given a weatherproof protective treatment. After passing through and cooling the electrical machine 1 the air passes through the large-diameter high-pressure fan 8 and is ejected from the open-ventilation system in the high-velocity outlet stream.

The large-diameter high-pressure fan 8 also indirectly acts to draw air out of the air cleaner 2 through the second outlet 20. Specifically, the fan 8 creates the high-velocity outlet stream and the action of that stream passing a downstream end 24 of the second outlet 20 creates a pressure differential across the length of the second outlet 20 due to the 'Bernoulli effect'. The pressure at the downstream end 24 will be reduced by this effect and therefore will be lower than the pressure at an upstream end 26 that is formed in the air chamber 12. The pressure difference results in air being drawn out of the air chamber 12 through the second outlet 20 and into the high-velocity outlet stream. As the first end 26 of the second outlet 20 is formed in the air chamber 12 adjacent to the radially outer edge of the rotating means 14, particles that enter the air chamber 12 in the incoming air and are thrown to the radially outer edge of the rotating means 14 will be drawn out of the air chamber through the second outlet 20 so that they can be ejected by the high-velocity outlet stream of the open-ventilation system and will not pass through the electrical machine 1.

Figure 2:
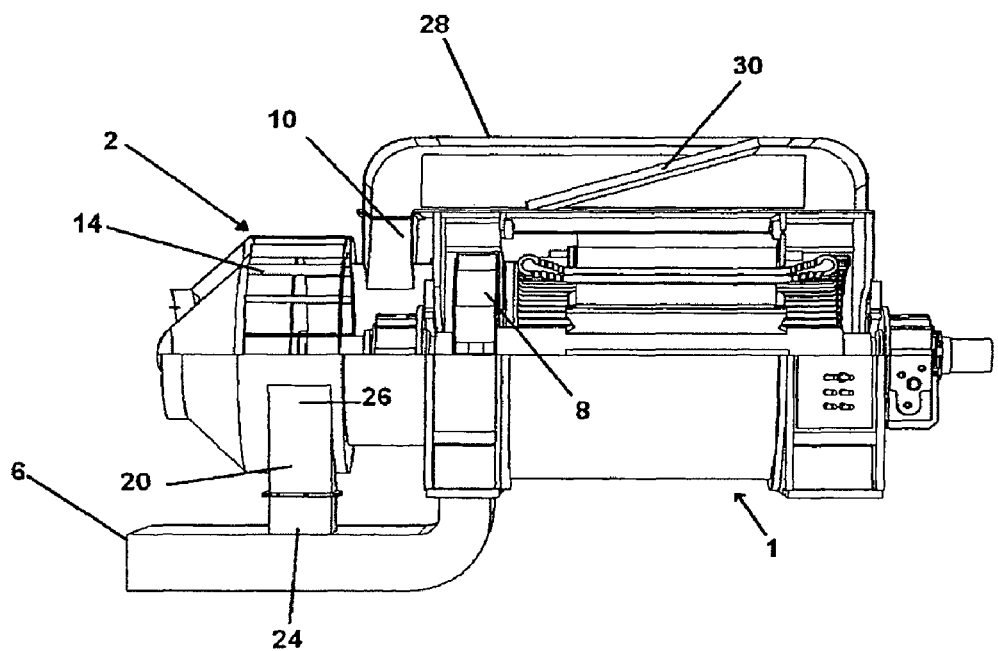
FIG. 2 is a detailed cross-sectional view of an electrical machine that incorporates a forced air open-ventilation system that includes a preferred embodiment of an air cleaner according to the present invention.
Figure 3:
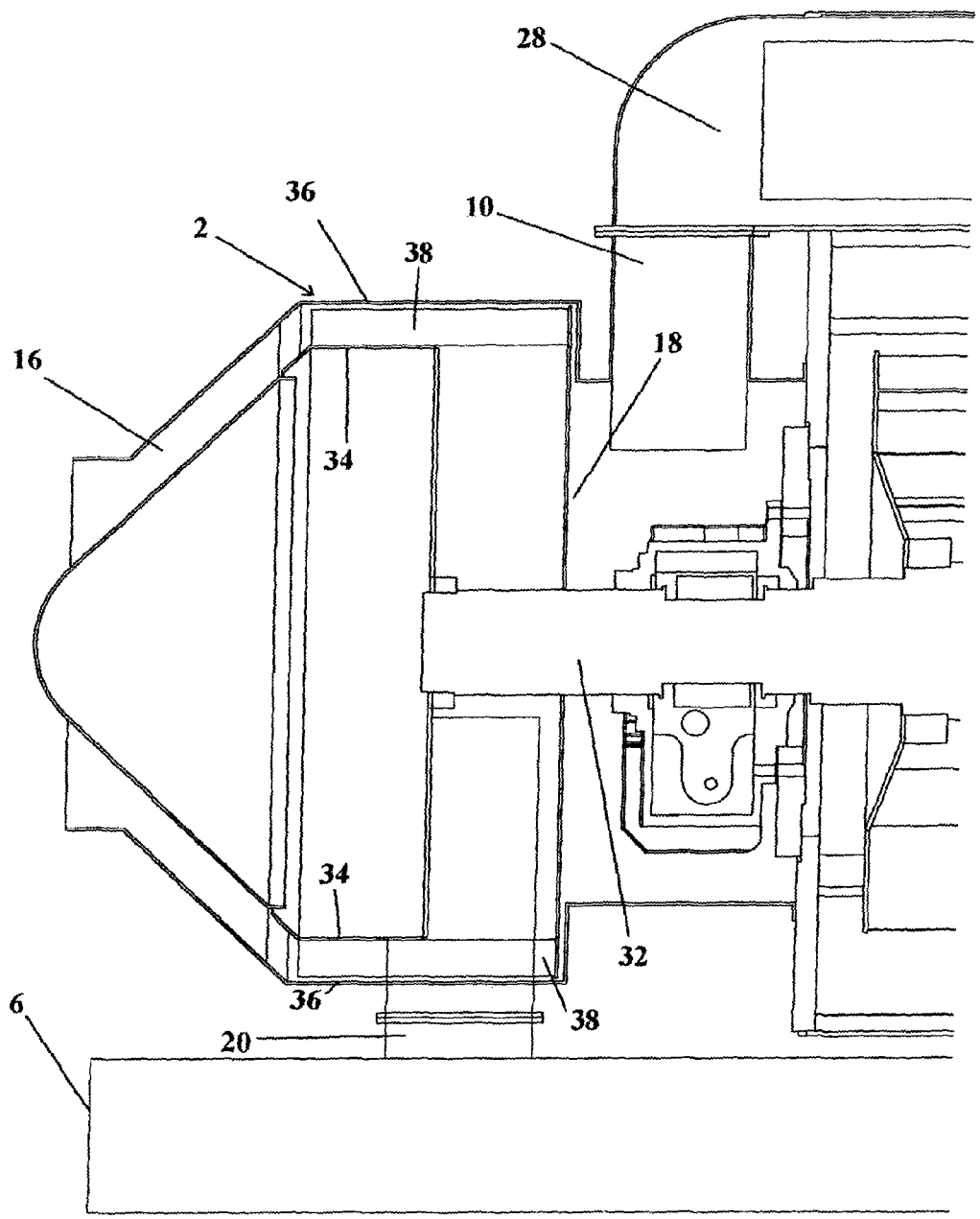
FIG. 3 is a close-up cross-section of a part of the open-ventilation system of FIG. 2 that shows the air cleaner.

A preferred embodiment of the present invention can be, seen in FIGS. 2 and 3. The construction of this embodiment is substantially as described above and as schematically illustrated in FIG. 1. Therefore, the same reference numerals have been used to denote the features of the preferred embodiment. However, further specific features of the preferred embodiment will be understood from the following description.

In the preferred embodiment a wind turbine generator 1 is cooled by an open-ventilation system containing an air cleaner 2 according to the present invention. The wind turbine generator 1 is of a conventional construction.

Both the rotating means 14 of the air cleaner 2 and large-diameter high pressure fan 8 of the open-ventilation system are mounted on the shaft 32 of the generator 1. This ensures that the open-ventilation system, including the air cleaner 2, is operating when the generator 1 is running and the generator will always be cooled sufficiently. This construction also ensures that the rotating means 14 and the fan 8 always rotate at the same rate as the shaft of the generator 1.

The conical inlet 16 and the air chamber 12 of the preferred embodiment are formed such that air entering the chamber inlet must pass through the rotating means 14. Specifically, the air chamber 12 has an intermediate wall 34 that is concentric with the outer wall 36 of the chamber. The intermediate wall 34 extends approximately half-way across the chamber from the first end of the chamber that is adjacent to the conical inlet 16. The radius of the intermediate wall 34 about the central axis 22 is substantially equal to the radius of the inlet 16 at its intersection with the air chamber 12 and the intermediate wall and the inlet are joined thereat. In this manner, air entering the air chamber 12 must pass through an annular channel formed between the intermediate wall 34 and the outer wall of the chamber.

The rotating means 14 is formed along the axial length of the air chamber 12 and consists of a plurality of vanes 38 that are rotatable about the central axis of the air chamber. Each vane 38 extends axially along the length of the air chamber 12 and is contained within the annular channel formed between the intermediate wall 34 and the outer wall 36 of the air chamber over approximately half of their axial length. Thus, when the generator 1 is operating, air drawn into the air chamber 12 will necessarily be subject to the action of the rotating means 14.

The second outlet 20 is formed at the lower side of the air chamber 12 such that any particles that are precipitated out of the air by the rotating means 14, or simply by loss of kinetic energy, and that fall to the bottom of the chamber 12 will pass through the second outlet 20 to the chamber and are ejected from the open-ventilation system.

The area of the first outlet 18 of the air chamber 12 is maximised in order to minimise the velocity of the air within the air chamber in the radially inward direction. Specifically, the first outlet 18 is a circular opening formed at the second end of the air chamber 12 and is coaxial with the air chamber. The radially outer edge of the first outlet 18 is formed a small distance radially inwardly from the inner edges of the vanes 38 of the rotating means 14 in order to minimise the number of particles that exit the air chamber 12 through the first outlet. Minimising the velocity of the air in the radially inward direction minimises the velocity pressure of the air within the air chamber 12. As discussed above, and as will be apparent to a person skilled in the art, this is important as the velocity pressure of the air opposes the centrifugal force from the rotating means 14.

After air has passed through the first outlet 18 it will pass through ducting 10 to the filter enclosure 28. Any remaining particles in the air will be removed by the filter before the air passes through and cools the generator 1. The air will then pass through the fan 8 before exiting the open-ventilation system at the outlet 6.

The invention claimed is:

1. A forced air open-ventilation system for an electrical machine structured to have air channeled therethrough, the forced air open-ventilation system comprising:
air forcing means for creating a high-velocity outlet stream, the air forcing means disposed downstream of the electrical machine;
an air cleaner having an air chamber and a rotating means, the air chamber having at least an outer wall, at least one inlet through which air is drawn in from the surroundings by the air forcing means of the open-ventilation system, at least one first outlet through which air that is substantially particle free is drawn out of the air chamber by the air forcing means, at least one second outlet through which air is drawn out of the air chamber by the high-velocity outlet stream of the open-ventilation system, and, the rotating means contained within the air chamber and drivable to rotate about an axis to subject the air within the air chamber to a centrifugal force such that any particles within the air chamber are thrown radially outwardly towards the at least one second outlet;
a filter adapted to remove from the air any particles not removed from the air chamber via the at least one second outlet, the filter disposed downstream of the air chamber;
an outlet through which the high-velocity outlet stream is ejected from the open-ventilation system;
wherein the at least one air chamber first outlet is formed at or near the axis of the rotating means;
wherein the at least one air chamber second outlet has an upstream end that is formed in the outer wall of the air chamber adjacent to the radially outer edge of the rotating means and a downstream end that leads to a portion of the open-ventilation system that is located after the air forcing means but before the outlet; and
wherein the air forcing means of the open-ventilation system is located at or near the outlet but before the downstream end of the at least one second outlet such that the effect of the high-velocity outlet stream passing the downstream end of the at least one air chamber second outlet creates a pressure differential across the length of the at least one second outlet which results in air and any particles within the air chamber that have been thrown radially outwardly towards the at least one second outlet by the rotating means being drawn out of the air chamber through the at least one air chamber second outlet and into the high-velocity outlet stream to be ejected through the outlet.

2. A forced air open-ventilation system according to claim 1, wherein the at least one second outlet is formed adjacent a radially outer edge of the rotating means.

3. A forced air open-ventilation system according to claim 1, wherein the air chamber is substantially cylindrical.

4. A forced air open-ventilation system according to claim 1, wherein the air chamber is coaxial with the axis of the rotating means.

5. A forced air open-ventilation system according to claim 1, wherein the air chamber outer wall is substantially cylindrical and is disposed adjacent to a radially outer edge of the rotating means.

6. A forced air open-ventilation system according to claim 1, wherein the air chamber includes opposite ends that are adjacent axial ends of the rotating means.

7. A forced air open-ventilation system according to claim 1, wherein the at least one first inlet of the air chamber is formed adjacent a radially outer edge of the rotating means.

8. A forced air open-ventilation system according to claim 1, wherein the at least one first inlet of the air chamber includes an opening at an upstream end, a substantially conical internal passage, and an annular opening formed at a downstream end.

9. A forced air open-ventilation system according to claim 8, wherein the at least one first inlet is substantially rotationally symmetric and coaxial with the rotating means.

10. A forced air open-ventilation system according to claim 1, wherein the at least one first outlet is substantially circular in cross-section.

11. A forced air open-ventilation system according to claim 10, wherein the at least one first outlet is substantially coaxial with, and has a smaller radius than, the rotating means.

12. A forced air open-ventilation system according to claim 1, wherein the at least one second outlet is formed at a lower side of the air chamber.

13. A forced air open-ventilation system according to claim 1, wherein the pressure of the high-velocity outlet stream is reduced as it passes the at least one second outlet of the air chamber.

14. A forced air open-ventilation system according to claim 1, wherein the air forcing means is located at or near the high-velocity outlet stream, before the at least one second outlet of the air cleaner.

15. A forced air open-ventilation system according to claim 14, wherein the air forcing means is a high-pressure large-diameter fan.

16. An electrical machine structured to have air channeled therethrough, the electrical machine comprising:
  a rotating shaft;
  a forced air open-ventilation system including an air forcing means, an air chamber, a filter, and an outlet;
  the air forcing means for creating a high-velocity outlet stream, the air forcing means disposed downstream of the electrical machine;
  an air cleaner having an air chamber and a rotating means, the air chamber having at least an outer wall, at least one inlet through which air is drawn in from the surroundings by the air forcing means of the open-ventilation system, at least one first outlet through which air that is substantially particle free is drawn out of the air chamber by the air forcing means, at least one second outlet through which air is drawn out of the air chamber by the high-velocity outlet stream of the open-ventilation system, and, the rotating means contained within the air chamber and drivable to rotate about an axis to subject the air within the air chamber to a centrifugal force such that any particles within the air chamber are thrown radially outwardly towards the at least one second outlet;
  the air chamber rotating means being coupled to, and driven by, the rotating shaft;
  a filter adapted to remove from the air any particles not removed from the air chamber via the at least one second outlet;
  an outlet through which the high-velocity outlet stream is ejected from the open-ventilation system;
  wherein the at least one first outlet is formed at or near the axis of the rotating means;
  wherein the at least one second outlet has an upstream end that is formed in the outer wall of the air chamber adjacent to the radially outer edge of the rotating means and a downstream end that leads to a portion of the open-ventilation system that is located after the air forcing means but before the outlet; and
  wherein the air forcing means of the open-ventilation system is located at or near the outlet but before the downstream end of the at least one second outlet such that the effect of the high-velocity outlet stream passing the downstream end of the at least one second outlet creates a pressure differential across the length of the at least one second outlet which results in air and any particles within the air chamber that have been thrown radially outwardly towards the at least one second outlet by the rotating means being drawn out of the air chamber through the at least one second outlet and into the high-velocity outlet stream to be ejected through the outlet.

17. An electrical machine structured to have air channeled therethrough and having a rotating shaft, the electrical machine comprising:
  a drive mechanism;
  a forced air open-ventilation system including an air forcing means, an air chamber, a filter, and an outlet;
  the air forcing means for creating a high-velocity outlet stream, the air forcing means disposed downstream of the electrical machine;
  an air cleaner having an air chamber and a rotating means, the air chamber having at least an outer wall, at least one inlet through which air is drawn in from the surroundings by the air forcing means of the open-ventilation system, at least one first outlet through which air that is substantially particle free is drawn out of the air chamber by the air forcing means, at least one second outlet through which air is drawn out of the air chamber by the high-velocity outlet stream of the open-ventilation system, and, the rotating means contained within the air chamber and drivable to rotate about an axis to subject the air within the air chamber to a centrifugal force such that any particles within the air chamber are thrown radially outwardly towards the at least one second outlet;
  the air chamber rotating means being coupled to, and driven by, the drive mechanism, wherein the operation of the rotating means is substantially independent from the operation of the electrical machine rotating shaft;
  a filter adapted to remove from the air any particles not removed from the air chamber via the at least one second outlet;
  an outlet through which the high-velocity outlet stream is ejected from the open-ventilation system;
  wherein the at least one first outlet is formed at or near the axis of the rotating means;
  wherein the at least one second outlet has an upstream end that is formed in the outer wall of the air chamber adjacent to the radially outer edge of the rotating means and a downstream end that leads to a portion of the open-ventilation system that is located after the air forcing means but before the outlet; and
  wherein the air forcing means of the open-ventilation system is located at or near the outlet but before the downstream end of the at least one second outlet such that the effect of the high-velocity outlet stream passing the downstream end of the at least one second outlet creates a pressure differential across the length of the at least one second outlet which results in air and any particles within the air chamber that have been thrown radially outwardly towards the at least one second outlet by the rotating means being drawn out of the air chamber through the at least one second outlet and into the high-velocity outlet stream to be ejected through the outlet.

18. An electrical machine according to claim 17, wherein the operation of the driving mechanism is controlled via feed-back from sensors which detect characteristics of the operation of the open-ventilation system.

* * * * *

UNITED STATES PATENT AND TRADEMARK OFFICE
CERTIFICATE OF CORRECTION

PATENT NO. : 8,097,070 B2
APPLICATION NO. : 12/596687
DATED : January 17, 2012
INVENTOR(S) : Graham Le Flem Page 1 of 1

It is certified that error appears in the above-identified patent and that said Letters Patent is hereby corrected as shown below:

Front page, second column, ABSTRACT, line 1, "systems" should read --system--.
Column 10, line 65, "$r\,\rho_0 > 3.3 \times 10^4$" should read --$r\,\rho_0 > 3.3 \times 10^{-4}$--.

Signed and Sealed this
First Day of May, 2012

David J. Kappos
*Director of the United States Patent and Trademark Office*